Patented Feb. 16, 1937

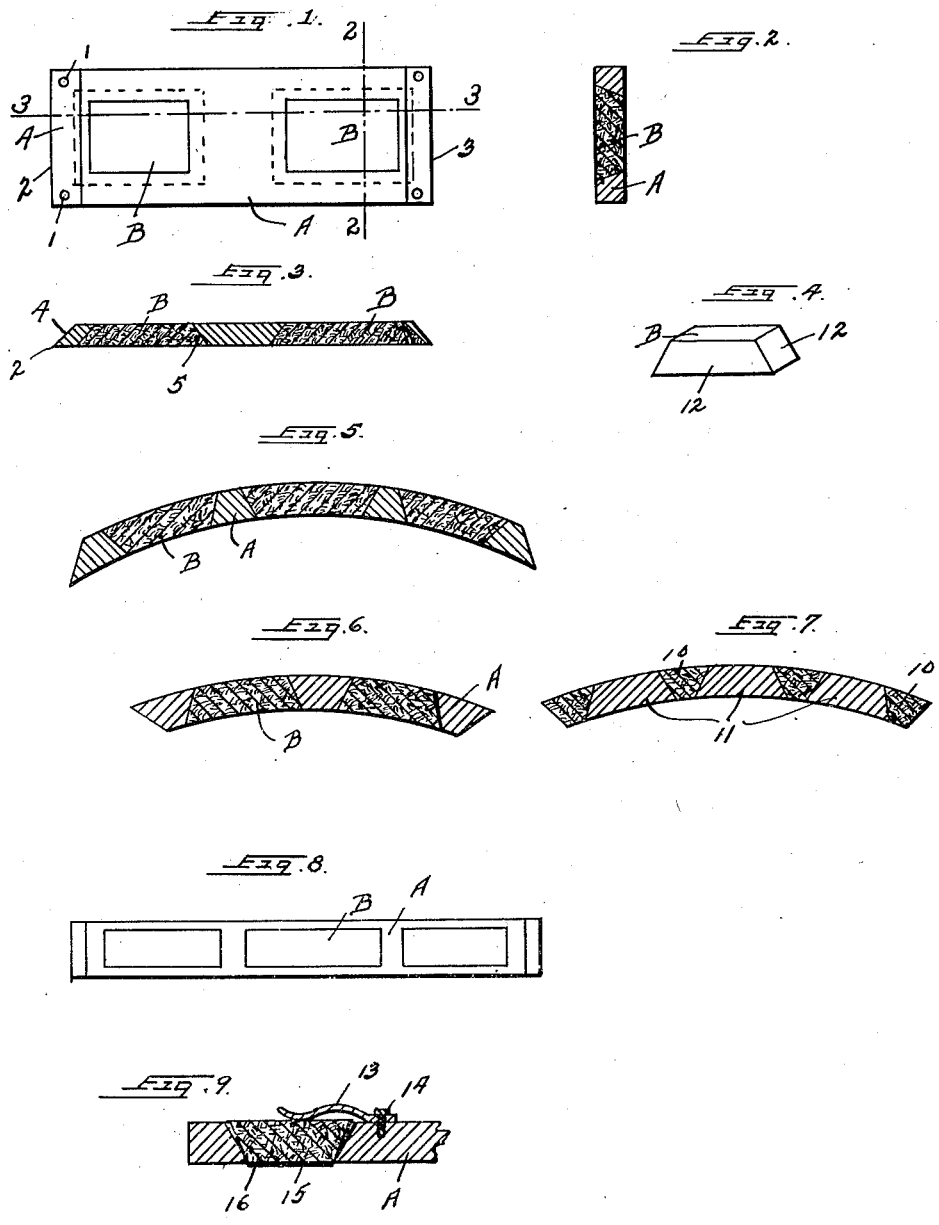

2,070,947

UNITED STATES PATENT OFFICE 2,070,947

BRAKE BLOCK

Emil J. Klemm, Jr., Salt Lake City, Utah

Application November 25, 1933, Serial No. 699,672

2 Claims. (Cl. 188—251)

My invention relates to brake blocks and has for its object to provide a new and highly efficient brake block having greater braking effect and longer life.

A further object is to provide a brake block which will be formed with metal material surrounding inserts of fiber material with the fiber held in the metal to engage the brake drum simultaneously with the metal.

A still further object is to provide a brake block which will not heat as much as do the usual composition or asbestos brake blocks, due to the fact that the metal or case will absorb some of the heat from the fiber inserts and diffuse this heat into the atmosphere.

A still further object is to provide a brake block which when made will be so constructed of copper lead alloy carrying some other ingredients, and having spaced apart openings therein in which suitable inserts of some fibrous material such as asbestos combinations or other suitable material are secured and adapted to engage the braking surface at the same time as the metal, giving greater braking effect.

A still further object is to provide a brake so constructed that fiber or asbestos inserts will not become crushed by the extreme pressure applied thereto to brake the vehicle. This is brought about by the metal case surrounding the asbestos inserts.

A still further object is to provide a removable fibrous insert to be set in metallic brake linings so that the insert may be removed when it has become worn. The metal brake linings will outwear the fiber inserts and it will become necessary to replace the inserts with new blocks and this may be done by removal of the lining and replacing of the inserts.

These objects I accomplish with the device illustrated in the accompanying drawing in which similar numerals and letters of reference indicate like parts throughout the several views and as described in the specification forming a part of this application and pointed out in the appended claims.

In the drawing in which I have shown my device

Figure 1 is a plan view of a flat brake block having the inserts therein shown from the reverse side.

Figure 2 is a section on line 2—2 of Figure 1.

Figure 3 is a section on line 3—3 of Figure 1.

Figure 4 is a perspective view of one of the inserts of the brake block.

Figure 5 is a section of a brake block used on external contracting brakes.

Figure 6 is a section of a brake block as used on internal expanding brakes.

Figure 7 is a sectional view of a brake block made with metallic inserts carried in a fibrous or cast case, in reverse to the type shown in the other figures.

Figure 8 is a plan view of Figure 5.

Figure 9 is a sectional view of one end portion of a brake block showing a means for applying spring pressure to the insert with the insert shown of greater thickness than the block.

In the drawing I have shown the metallic brake lining block as A, having holes therein to secure the block to the brake element. Each end 2 and 3 of the block A is provided with a beveled face 4 to provide a self cleaning brake feature with the thin edge adapted to scrape foreign material from the drum and thereby clean the drum. Through the block A, I then provide fibrous inserts B preferably of the asbestos bass type, said inserts being made to fit into frusto-pyramidical sockets 5 and the inserts B are also made frusto-pyramidical in form to fit these sockets.

As will be obvious, the form of the sockets may be frusto-conical and the inserts formed frusto-conical if desired, or in some cases the walls of the sockets and the walls of the inserts may be made parallel or nearly so with the blocks inserted through the like formed sockets in the brake lining.

In the type of device shown in Figure 7, a fibrous brake block is shown as 10 with metal inserts 11 shown therein. Also it may be possible to use separate springs behind each insert to hold the insert more firmly against the braking surface as shown in Fig. 9.

As shown in Figure 4 the beveled edges 12 of the insert B may be at any angle and also the slanting edges of the opening in the brake block may be set in any angle desired, but it is preferable to make the block in such a form that the top end of the frustum of the pyramid or cone is the engaging surface of the inserts.

In Figure 9 a leaf spring 13 is secured to the brake block A by a set screw 14 and the insert 15 in this view and this type is made thicker than the block A with the beveled edges of the insert so formed that they may be pressed farther into the opening in the block when the outer surface becomes worn away from continued braking action and the inner face 16 of the insert is shown extending in beyond the inner face of the block.

Having thus described my invention I desire to secure by Letters Patent and claim:

1. In a brake block, the combination of a metallic block formed of metal alloy of copper, and lead; frusto-conical openings through said block; frusto-conical asbestos fiber inserts through said openings.

2. In a brake block, the combination of a casing formed to fit the braking surface, said casing being made of a copper, lead, alloy; frusto-pyramidical openings through said casing; and frusto-pyramidical inserts made of asbestos fiber and formed to fit said openings in the casing with the braking surface of the casing and inserts flush with each other.

EMIL J. KLEMM, Jr.